(12) United States Patent  (10) Patent No.: US 7,674,305 B2
Lillquist  (45) Date of Patent: Mar. 9, 2010

(54) AIR CLEANING FAN/FAN BLADE

(76) Inventor: Steven R. Lillquist, 701 Paris Kirby Rd., Milford, DE (US) 19963

( * ) Notice: Subject to any disclaimer, the term of this patent is extended or adjusted under 35 U.S.C. 154(b) by 710 days.

(21) Appl. No.: 11/507,991

(22) Filed: Aug. 23, 2006

(65) Prior Publication Data

US 2008/0047241 A1    Feb. 28, 2008

(51) Int. Cl.
B01D 46/00 (2006.01)
(52) U.S. Cl. .................. 55/467; 55/385.1
(58) Field of Classification Search ............... 55/467, 55/385.1
See application file for complete search history.

(56) References Cited

U.S. PATENT DOCUMENTS

| 1,680,775 | A |   | 8/1928 | Faber | 415/146 |
|---|---|---|---|---|---|
| 1,895,565 | A | * | 1/1933 | Bell | 126/110 D |
| 1,903,471 | A | * | 4/1933 | Murphy | 165/87 |
| 1,990,801 | A |   | 2/1935 | Spear | 415/146 |
| 4,422,824 | A |   | 12/1983 | Eisenhardt, Jr. | 416/5 |
| 4,560,321 | A |   | 12/1985 | Kawai | 416/5 |
| 4,676,721 | A |   | 6/1987 | Hardee | 416/146 |
| 4,753,573 | A |   | 6/1988 | McKnight | 416/62 |
| 4,840,650 | A | * | 6/1989 | Matherne | 55/385.1 |
| 4,889,543 | A |   | 12/1989 | Burt | 55/97 |
| 5,562,412 | A | * | 10/1996 | Antonelli | 416/62 |
| 5,564,900 | A | * | 10/1996 | McAuley | 416/62 |
| 5,586,862 | A |   | 12/1996 | Danner | 416/5 |
| 5,795,131 | A |   | 8/1998 | Crowhurst et al. | 416/5 |
| 6,099,609 | A | * | 8/2000 | Lira et al. | 55/400 |
| 6,174,340 | B1 |   | 1/2001 | Hodge | 55/385.1 |
| 6,733,239 | B2 | * | 5/2004 | Lee | 416/62 |
| 6,779,976 | B1 |   | 8/2004 | Carfagna et al. | 416/5 |
| 6,790,004 | B2 | * | 9/2004 | Steinheiser | 416/65 |
| 6,857,852 | B1 | * | 2/2005 | Carfagna et al. | 416/62 |
| 6,994,522 | B1 | * | 2/2006 | Chin-Chih et al. | 416/146 R |
| 7,104,755 | B2 | * | 9/2006 | Owens et al. | 416/62 |
| 2004/0084544 | A1 | * | 5/2004 | Boyd et al. | 237/46 |

* cited by examiner

*Primary Examiner*—Robert J Hill, Jr.
*Assistant Examiner*—Christopher P Jones
(74) *Attorney, Agent, or Firm*—John C. Andrade

(57) ABSTRACT

A fan blade having a hollow housing allowing air to enter into the front or rear opening of the fan blade and directed to exit out the side opening of the fan blade after having passed through a filter. Use of this fan blade is a method for removing particulates from the air.

15 Claims, 6 Drawing Sheets

AIR CLEANING FAN/FAN BLADE

BACKGROUND OF THE INVENTION

1. Field of the Invention

The present invention relates to a method for removing particulates from air with a fan having a unique fan blade.

2. Description of the Prior Art

Various products are available to remove airborne pollutants from the air. Fans are used to move air and improve ventilation and have been used in various settings. Removing particulates from the air by use of a ceiling fan has been one method utilized to reduce air pollution and improve air quality.

U.S. Pat. No. 6,779,976B1 discloses a method for removing pollutants by attaching a multi layer stack of sheets to the surface of a fan blade. The sheets have a tacky surface disposed on their outward facing sides so that as the fan blade rotates pollutants are captured by the tacky surface. When the tacky surface of the topmost sheet becomes contaminated with pollutants, it is peeled off to expose a clean, uncontaminated next lower sheet.

U.S. Pat. No. 6,174,340 discloses a room air filter apparatus having a multi-sided housing. A fan is mounted to the housing and operably disposed within a plenum to draw air from the plenum and to exhaust the air outside of the housing.

U.S. Pat. No. 5,795,131 discloses a ceiling fan for cleaning air in a room wherein each blade of the ceiling fan has a cavity open to the top and bottom surface of each fan blade and a filter unit in each of the cavities but within the confines of the fan blade such that when the ceiling fan is operated the air flow created by the ceiling fan will be forced through the filter unit from the bottom surface through the top surface where the filter unit can collect airborne particles.

U.S. Pat. No. 4,422,824 discloses a hollow fan blade for use with a ceiling fan with a top and bottom located so as to provide an air space sufficiently large enough to house on one or more germicidal lights in such a manner that the light will burn while the fan blade rotates. Filtering pads are located in the leading and trailing edges of the airspace between the top and bottom of the hollow blade for the absorption of smoke and other objectionable odors as the air passes through the lamp area. The ends of the blade joining the leading and trailing edges are closed.

It is an object of the current invention to simplify the removal of air particulates by use of a unique fan blade creating a cyclonic effect and providing both better air dispersion and better removal of air particulates.

SUMMARY OF THE INVENTION

The unique fan blade of the current invention operates to create a cyclone and preferably the fan blade is designed so that it can achieve this effect by working in both clockwise and counter-clockwise directions. The filtering system filters air through the side end of the blade and the fan blade sends air out the side end of the blade and pushes air to the perimeter of a room. Inside of the fan blade is a directional vane that will automatically change with the direction of the rotation in order to maximize the air directed to the end of the fan blade. There are many uses for the fan blade of the current invention such as providing better air quality in a hospital or clean room environment, and use with food and beverage industries, educational and scientific laboratories, the entertainment business, smoke extraction and would have various household and industrial advantages. The advantages themselves comprise removing pollen, mold, odor, dust, smoke, germs, pet dander, powders and providing better airflow. In addition the units should be fairly inexpensive to produce and can be effective in a wide range of applications.

The specifics of the present invention are first that it is a method for removing particulates from the air providing a fan having a plurality of radially extending fan blades and at least one of the fan blades having a first opening for air to pass through, a filter and a second opening located sideways of the first opening for air to exit one or more of the fan blades. The fan is then rotated so that air enters into the first opening, passes through the filter and exits through the side opening. A cyclonic effect is then generated on particulates in the air prior to their entering the first opening. The unique fan blade itself comprises a hollow housing having a top and bottom piece and a front opening and a side opening through which air may pass and a means for directing the air entering the front opening exiting out the side opening. The distance between the top and bottom piece decreases with the distance from the side opening. The fan blade preferably has both a rear and a front opening and a directional vane capable of pivoting from a position of directing the air from the front opening through the side opening to a position of directing the air from the rear opening through the side opening depending on whether the fan is being operated in the clockwise or the counter-clockwise direction. There are means for preventing the directional vane from extending past the front and rear openings of the housing which include a first and second spacer each extending from the top piece to the bottom piece with the first spacer position in the rear opening and the second spacer position in the front opening. This allows for a vacuum effect by preventing the directional vane from extending out past the opening on the other side and thus directing the air to exit the side opening. The directional vane rotates around a cylindrically shaped floater rigidly connected to the directional vane and a cylindrically shaped receiving means in which the cylindrically shaped floater sits, located opposite the side opening between the top and bottom piece at the end of the duck head-shaped base. A solid rear piece extending from top to bottom can be utilized in place of the directional vane, but the fan can then only be operated in one direction. The fan blade also has a means for filtering particulates out of the air preferably by use of a filter located between the top and bottom piece and situated so that air passing from either the front or the rear opening must pass through the filter before exiting through the side opening. The filter is preferably located in a spring-loaded filter cartridge that can easily be attached and removed from the side opening of the fan blade. This allows for easy access to the filter for changing the filter. The filter material can be a number of different filtering type materials, but the best results thus far have been obtained with poly fiber, but other filtering material such as paper and foam have been used successfully. An alternative to the air exiting the side of the fan blade, can be if the air is directed away from the front opening between the top and bottom piece and then directed out the top or bottom of the fan blade.

DESCRIPTION OF THE PREFERRED EMBODIMENT

Figure 1:
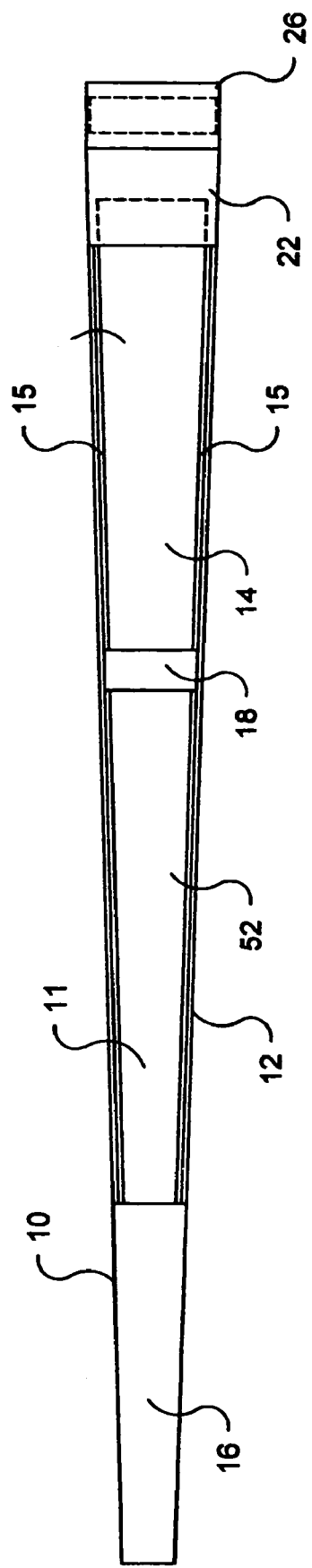
FIG. 1 is a front view of the fan blade.
Figure 2:
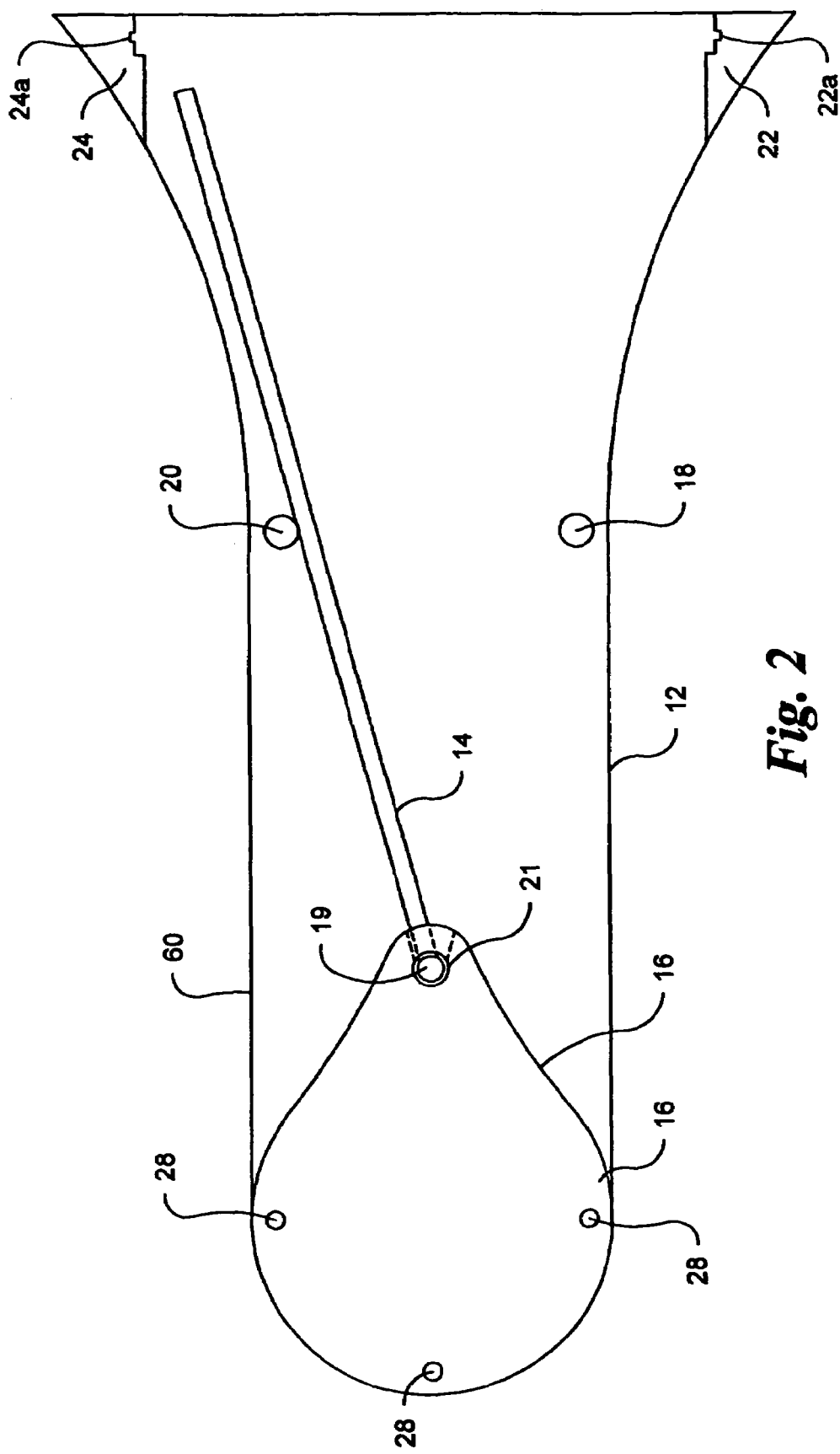
FIG. 2 is a top view of the fan blade with the top piece removed and without the filter cartridge holder.
Figure 4:
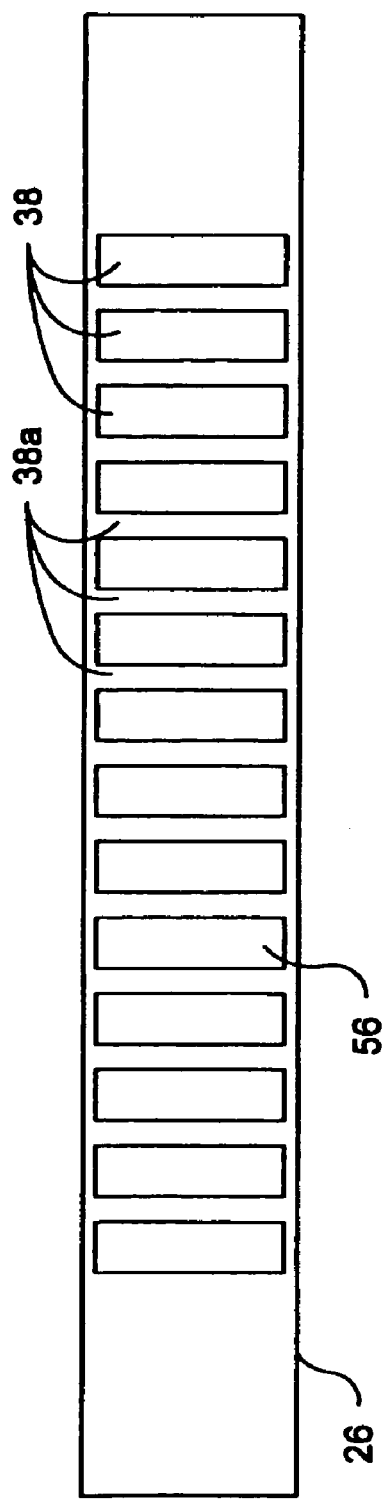
FIG. 4 is a side view of the filter cartridge holder.
Figure 5:
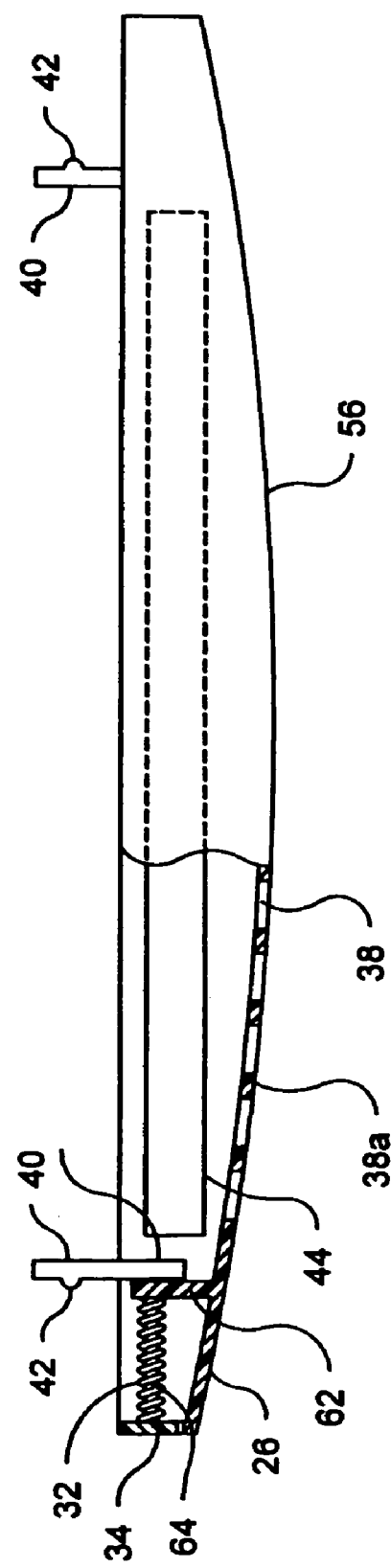
FIG. 5 is an exploded top view of the filter cartridge holder showing the filter.
Figure 6:
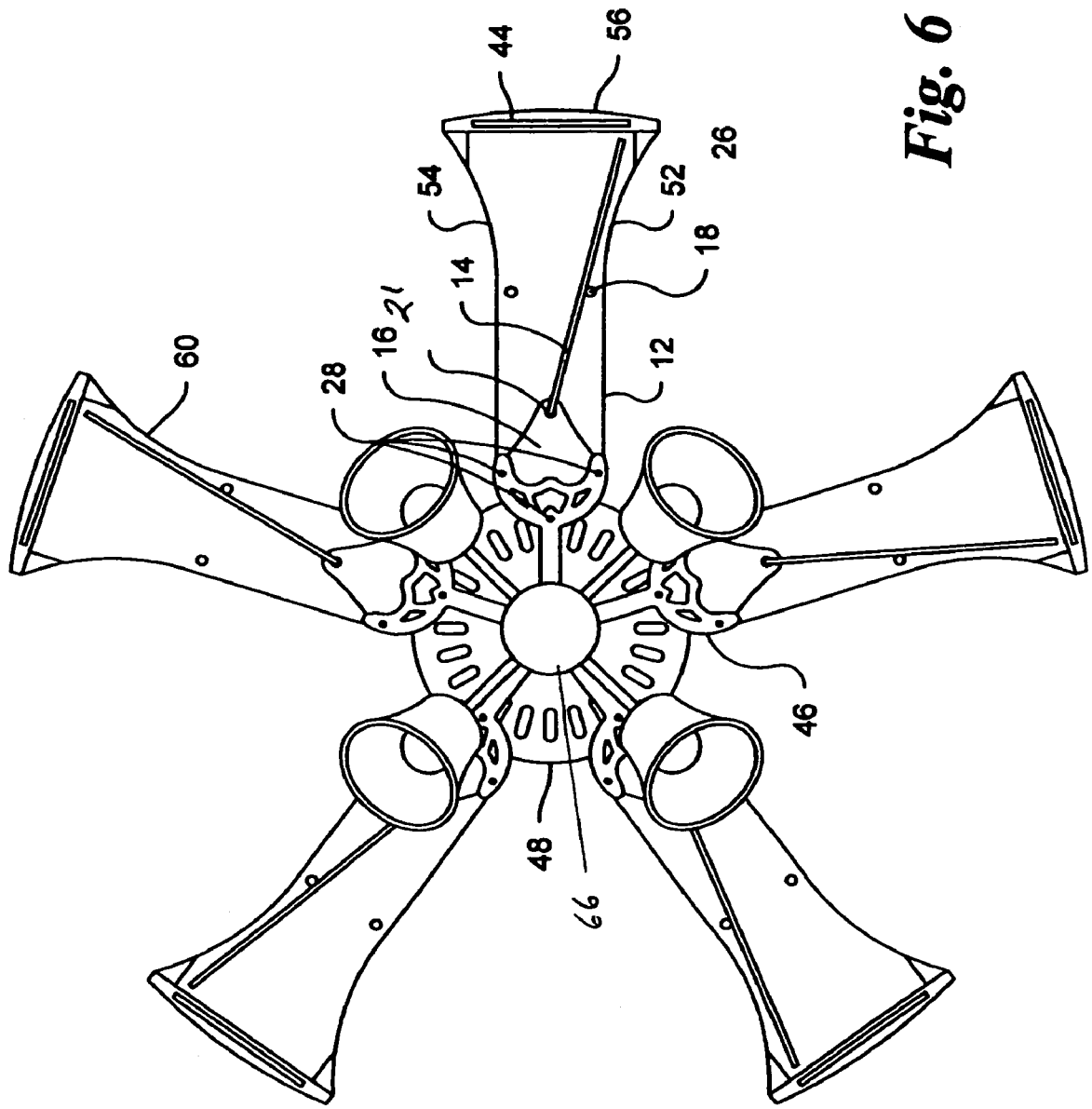
FIG. 6 is a bottom view of the fan having five fan blades.

The purpose of the current invention is to provide a better method for removing air contaminants or pollutants from the air and a fan and fan blade capable of easily removing the particulates through better air distribution, dispersion and filtering. FIG. 1 shows the top piece 10, the bottom piece 12, and the hollow housing 11, and also shows the duck head-shaped outer casing 16, better shown in FIG. 2. The fan blade 60 is tapered from the end of the fan blade 60 having the duck head-shaped casing 16 and receiving means 28 for a connection to the fan as shown in FIGS. 2 and 6, to the filter cartridge holder 26. The tapering of the fan is important in that it increases the cyclonic effect on the air drawn through the front opening 52. Also shown in FIG. 1 is the directional vane 14 having a cylindrically shaped floater 19 rigidly connected to it and sitting inside the cylindrically shaped receiving means 21 as shown in FIG. 2 and the vane 14 is free to rest against the first spacer 20 as shown in FIG. 2 and the second spacer 18 as shown in FIGS. 1 and 2. The spacers 18 and 20 both provide stability to the fan blade housing and operate to prevent the directional vane from extending past the front 52 or the rear 54 opening as shown in FIG. 6. This helps provide the vacuum effect that operates as the air enters the front 52 or the rear 54 opening depending on the direction of the fan and exits the side opening 56 as shown in FIG. 4. The directional vane 14 is shown in FIG. 1 with felt 15 on the top and bottom of the directional vane 14 closest to both the top 10 and bottom piece 12. This helps prevent air from escaping through anywhere other than the side opening 56. Also shown in FIG. 1 is the front structural support 22 which also has a side opening 22a as shown in FIG. 2 for receiving the protrusion 42 of the locking device piece 40, extending outside of the filter cartridge holder 26 for locking into that receiving means 22a, as shown in FIG. 5. The filter cartridge holder 26 is shown at the end of the fan blade and is removable for ease of changing the filter.

Figure 3:
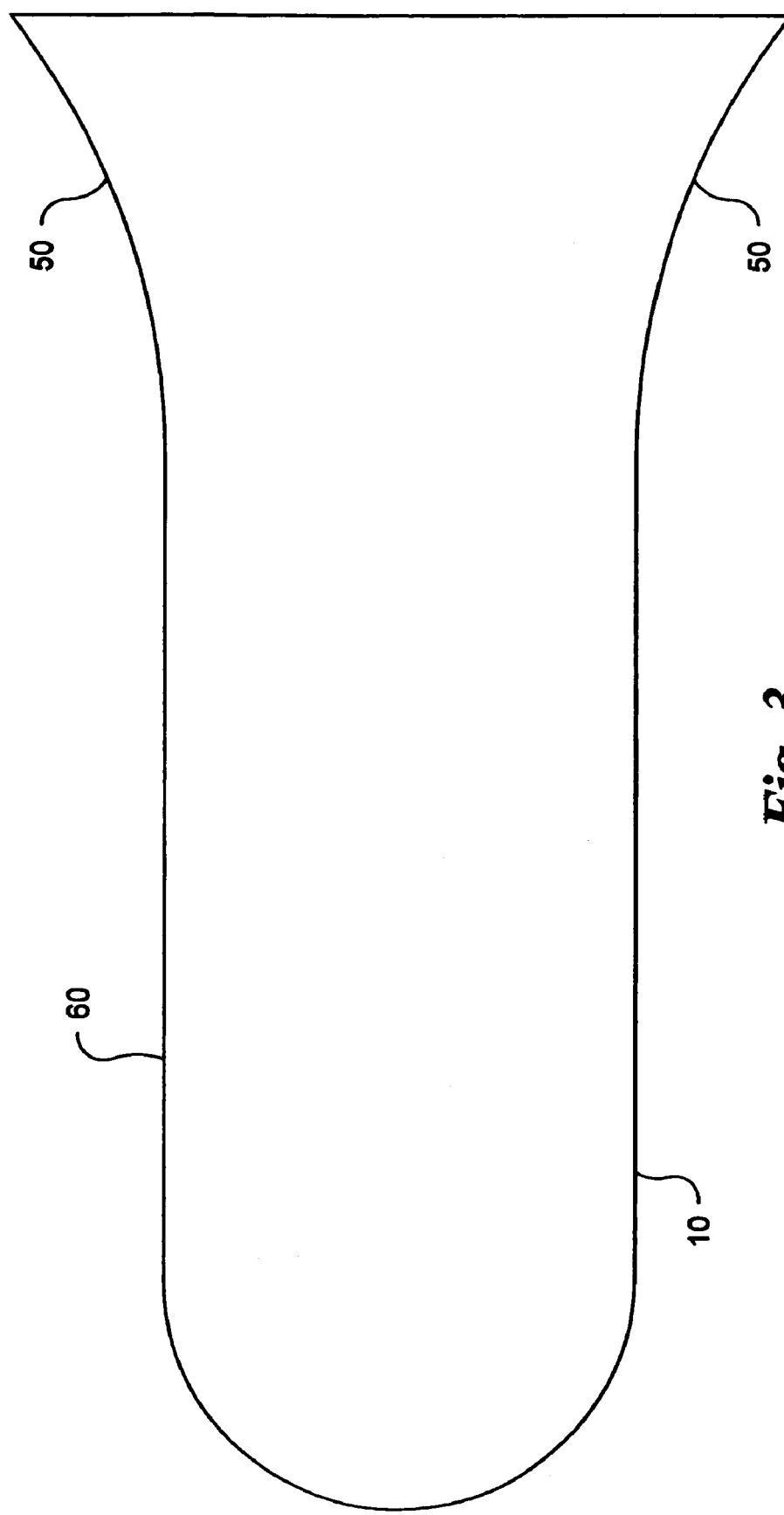
FIG. 3 is a top view of the fan blade.

FIG. 2 shows the duck head-shaped outer casing 16 and the three spacer/supports 28 within the duck head-shaped outer casing 16 and as shown are for connecting to the fan/fan blade connector 46 for connecting to the flywheel 66 attached to the fan motor 48 as shown in FIG. 6. The floater 19 allows for the directional vane 14 to push against the first spacer 20 when the fan is being operated in the clockwise direction and the air is entering through the front opening 52 as shown in FIG. 2 and then the directional vane 14 moves to butt against the second spacer 18 when the fan is moving in the counter-clockwise direction and the air is entering through the rear opening 54 as shown in FIG. 6. Also shown are the front 22 and rear 24 structural supports with the side openings 22a and 24a for receiving the protrusion 42 of the extension for locking into the receiving means 22a and 24a. FIG. 3 simply shows the top view of the fan blade without the filter cartridge holder 26, but shows the general shape of the fan blade where the fan blade is rounded at one end and then widens on the other side where the side opening connects to the filter cartridge. The widening 50 of the fan blade is shown on FIG. 3.

FIG. 4 shows a side view of the filter cartridge holder 26 from the perspective of looking back at the fan from a position away from the fan. The openings for the air to exit the side exit 56 of the fan blade are shown with a configuration of altering opening 38 and solid piece 38a. The configuration shown is just one of many configurations that can be utilized. The importance of the holder is to hold the filter, allow the air to exit through the side exit 56 and be easily removable as set out below. The filter cartridge holder 26 has at each end a spring 32, a push pin 64 that the spring 32 encircles, and a push button 34 for moving the locking piece 40 extending outside of the cartridge as shown in FIG. 5. The locking piece 40 sits against the support guide 62 until the push button 34 is pushed, and then the protrusion 42 which extends from the locking piece 40 as shown is pushed out of the receiving openings 22a and 24a, it is designed to fit, as shown in FIG. 2, allowing for removal of the filter cartridge 26.

The filter 44 as shown in FIG. 5 sits inside the filter cartridge holder 26 and can be easily removed by pushing on the push button release 34, removing the filter cartridge holder 26, removing and replacing the filter 44, and inserting the filter cartridge holder 26 back into the fan blade.

A bottom view of the fan having five fan blades of the present invention is shown in FIG. 6. The particular construction of the fan blade 60 in FIG. 6 is made of a clear plastic material to better see the workings of the fan blade. Since it is clear plastic the filter 44 can be seen inside the filter cartridge holder 26. In FIG. 6 it is actually being operated in the counter-clockwise direction so that the directional vane 14 is butting against the second spacer 18 so the air can pass through the rear opening 54 and then through the side opening 56 after passing through the filter 44. In addition the three spacer/supports 28 are shown connected to the fan/fan blade connector 46 which is attached to a flywheel 66 attached to the fan motor 48.

Figure 7:
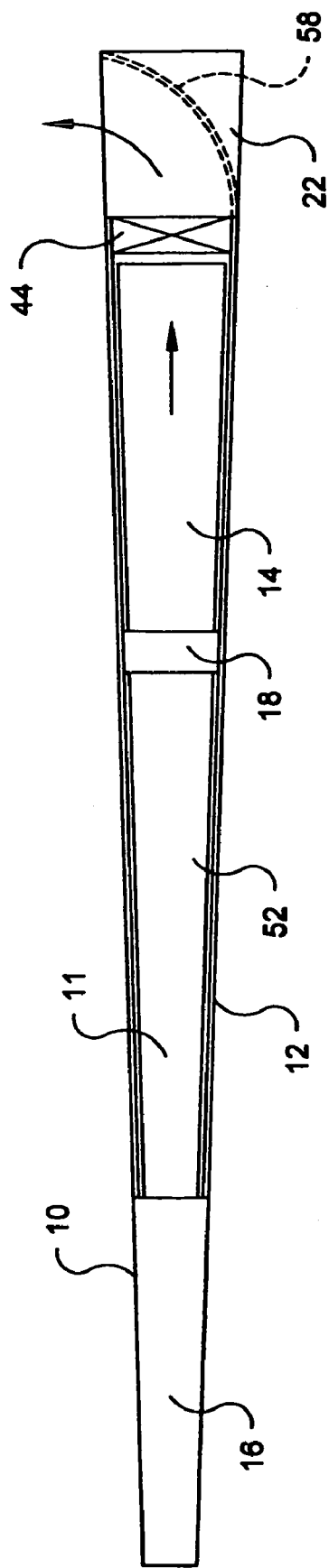
FIG. 7 is a front view of the fan blade with the air exiting out the top.
Figure 8:
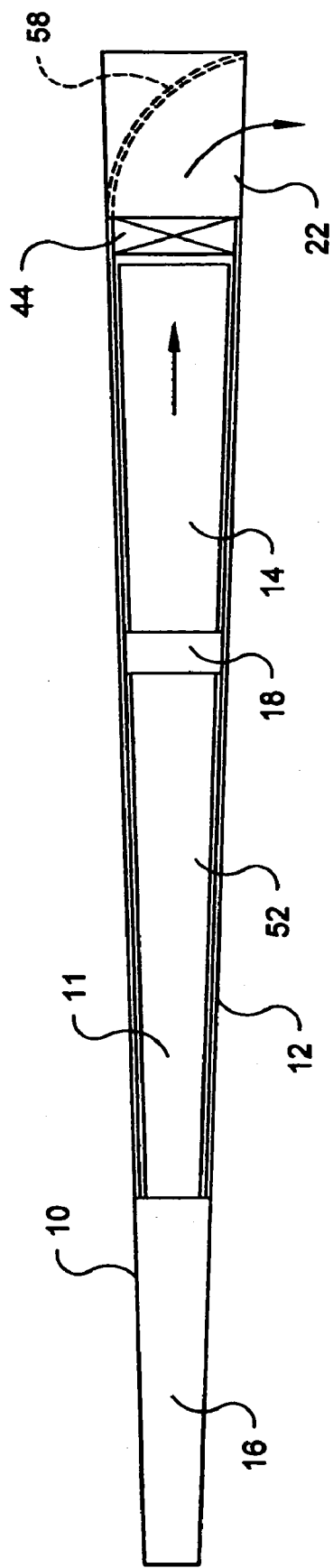
FIG. 8 is a front view of the fan blade with the air exiting out the bottom.

The present invention can also be designed so that the air is directed towards the side, but after passing through the filter 44 is redirected by a curved diffuser 58 out through an opening in the top piece 10 as shown in FIG. 7 and out through an opening in the bottom piece 12 as shown in FIG. 8.

Due to the construction and operation of the fan blade of the current invention, the fan motor must be more powerful and/or the size of the fan blade must be reduced.

The novel design of the present invention creates a cyclonic effect providing a different impact on airflow than conventional fan blades. The cyclonic effect causes air to be pushed more in a horizontal and eventually upward vertical direction rather than the typical downward flow of existing paddle fans. The best results have been obtained when the fan blade is tilted up at a 12° to 14° angle from horizontal.

The fan when used with three or more blades of the current invention equally spaced becomes self-balancing and reduces wobble in the operation of the fan.

I claim:

1. A fan blade comprising:
   a. a hollow housing having a top and bottom piece and a front opening, a rear opening, and a side opening on the outer perimeter of said fan blade through which air may pass; and
   b. a means for directing air entering the front opening to exit out said side opening.

2. The fan blade of claim 1 wherein said means for directing air is a directional vane pivoting from a position of directing the air from said front opening through said side opening to a position of directing the air from said rear opening through said side opening.

3. The fan blade of claim 2 further comprising a means for preventing the directional vane from extending past said front and rear openings of said hollow housing.

4. The fan blade of claim 3 further comprising a cylindrically shaped floater rigidly connected to said directional vane and a cylindrically shaped receiving means in which said cylindrically shaped floater sits and wherein said directional vane rotates around said cylindrically shaped receiving means located opposite said side opening between said top and bottom piece.

5. The fan blade of claim 4 further comprising a means for preventing air from passing between said directional vane and said top piece and between said directional vane and said bottom piece.

6. The fan blade of claim 3 wherein said means for preventing said directional vane from extending past said front and rear openings of said hollow housing are first and second spacers each extending from said top piece to said bottom piece and said first spacer positioned in the rear opening and said second spacer positioned in said front opening.

7. The fan blade of claim 1 wherein the distance between the top and bottom piece decreases with the distance from the side opening.

8. The fan blade of claim 1 further comprising a means for filtering particulates out of the air.

9. The fan blade of claim 8 wherein said means for filtering particulates out of the air is a filter located between said top and bottom piece and situated so that air passing from either said front opening or said rear opening must pass through said filter before exiting through said side opening.

10. The fan blade of claim 1 wherein said means for directing air entering said front opening is a solid rear piece extending from top to bottom.

11. A fan comprising:
  a. a plurality of radially extending fan blades;
  b. at least one of said fan blades comprising a hollow housing having a top and bottom piece and a front opening, a rear opening, and a side opening on the outer perimeter of said fan blades through which air may pass;
  c. a means for directing air entering the front opening and exiting out said side opening; and
  d. a means for turning said fan blades.

12. The fan of claim 11 wherein said means for directing air is a directional vane pivoting from a position of directing the air from said front opening through said side opening to a position of directing the air from said rear opening through said side opening.

13. The fan of claim 11 further comprising a means for filtering particulates out of the air.

14. The fan of claim 13 wherein said means for filtering particulates out of the air is a filter located between said top and bottom piece and situated so that air passing from either said front opening or said rear opening must pass through said filter before exiting through said side opening.

15. A fan blade comprising:
  a. a hollow housing having a top and bottom piece and a front opening through which air may pass;
  b. a means for directing air entering the front opening away from said front opening between said top and bottom piece;
  c. an opening in said top piece and a means for directing air through said top piece opening after passing through said front opening and between said top and bottom piece; and
  d. said fan blade further comprising an opening in said bottom piece and a means for directing air through said bottom piece opening after passing through said front opening and between said top and bottom piece.

* * * * *